(12) United States Patent
Prabhu

(10) Patent No.: US 6,393,821 B1
(45) Date of Patent: May 28, 2002

(54) METHOD FOR COLLECTION AND USE OF LOW-LEVEL METHANE EMISSIONS

(76) Inventor: Edan Prabhu, 22922 Tiagua, Mission Viejo, CA (US) 92692

(\*) Notice: Subject to any disclaimer, the term of this patent is extended or adjusted under 35 U.S.C. 154(b) by 0 days.

(21) Appl. No.: 09/713,574

(22) Filed: Nov. 14, 2000

Related U.S. Application Data

(63) Continuation-in-part of application No. 09/138,809, filed on Aug. 21, 1998, now abandoned.

(51) Int. Cl.$^7$ .................................................. F02L 1/00
(52) U.S. Cl. .................... 60/39.02; 60/39.12; 60/39.465
(58) Field of Search .............................. 60/39.02, 39.12, 60/39.465

(56) References Cited

U.S. PATENT DOCUMENTS

| | | | |
|---|---|---|---|
| 4,187,672 A | * 2/1980 | Rasoe | ....................... 60/39.12 |
| 4,202,169 A | 5/1980 | Acheson et al. | |
| 4,209,303 A | 6/1980 | Ricks | |
| 4,442,901 A | 4/1984 | Zison | |
| 4,469,176 A | 9/1984 | Zison et al. | |
| 4,493,770 A | 1/1985 | Moilliet | |
| 4,681,612 A | 7/1987 | O'Brien et al. | |
| 4,769,149 A | 9/1988 | Nobilet et al. | |
| 5,059,405 A | 10/1991 | Watson et al. | |
| 5,524,432 A | * 6/1996 | Hansel | ......................... 60/274 |
| 5,842,357 A | 12/1998 | Siwajek et al. | |

\* cited by examiner

Primary Examiner—Timothy S. Thorpe
Assistant Examiner—Ehud Gartenberg
(74) Attorney, Agent, or Firm—Gene Scott-Patent Law & Venture Group

(57) ABSTRACT

A building structure encloses a gaseous mixture of air and a combustible fuel. Air is obtained from the atmosphere, and the gaseous fuel is obtained from natural evolution and diffusion processes associated with rotting of materials, as from landfills, and gaseous digestion products from livestock, etc. A process control system is engaged for drawing off the gaseous mixture, at a selected air-fuel ratio, from the structure. The selected gaseous mixture is drawn from the building, through a compressor and then a preheater, into a catalytic combustor where the mixture is burned and directed into a turbine for producing work. This work is preferably converted into electricity by a generator driven by the turbine. A process controller senses process variables such as temperature, pressure, latent heat of fusion, etc. so as to assure that combustion cannot occur prematurely, but does occur most efficiently in the catalytic combustor. Process heat is exchanged for preheating the mixture to be burned.

22 Claims, 2 Drawing Sheets

Schematic of a Low-Energy Methane Recovery and Conversion System

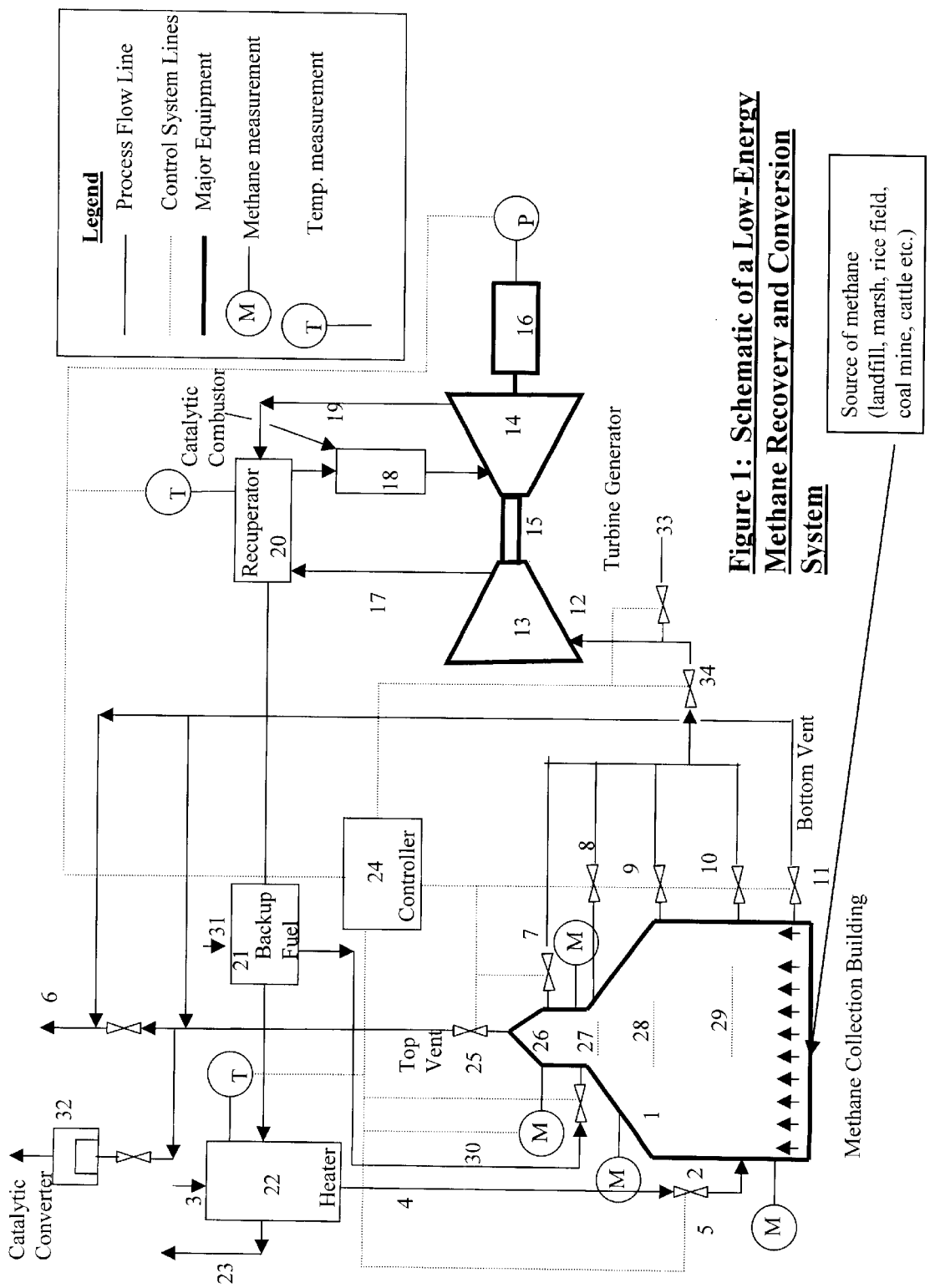
Figure 1: Schematic of a Low-Energy Methane Recovery and Conversion System

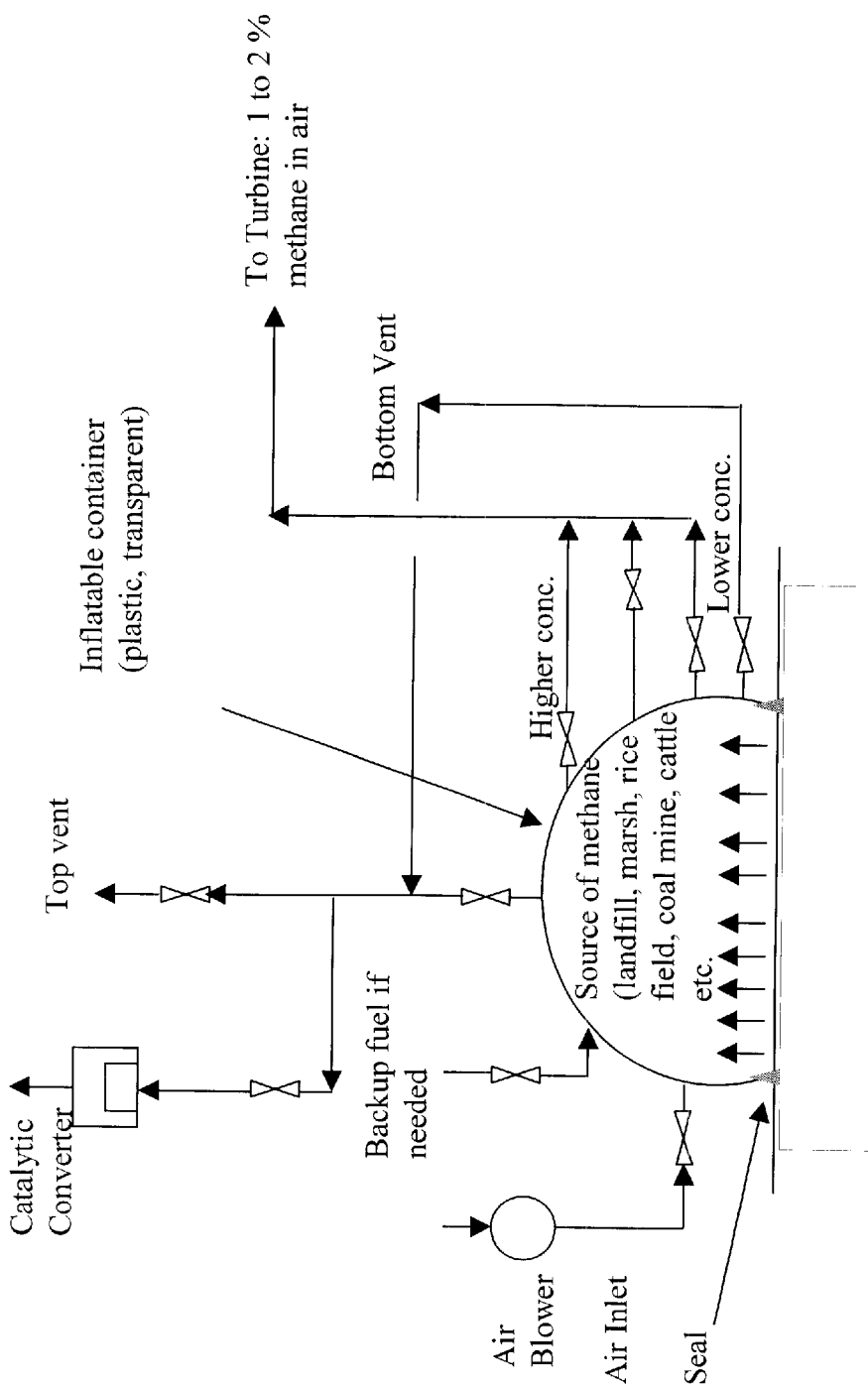
Figure 2: Inflatable Container for Methane Collection (Shown Inflated)

METHOD FOR COLLECTION AND USE OF LOW-LEVEL METHANE EMISSIONS

The present application is a Continuation-in-part of a prior filed application having a Ser. No. 09/138,809 and a filing date of Aug. 21, 1998 now abandoned.

BACKGROUND OF THE INVENTION

1. Field of the Invention

This invention relates generally to the use of low-level fuel gas emissions from natural and man-made sources and more particularly to an apparatus and method for the capture and use of low-level fuel gas emissions to produce electricity or other useful work.

2. Description of Field and Related Art

The following references are relevant to the present application:

Acheson, et al. U.S. Pat. No. 4,202,169, describes a gas turbine system for the recovery of power from fuel gases having a low heating value, i.e., below about 80 Btu/scf, and usually in the range of 35 to 70 Btu/scf, has an external catalytic combustor. The catalytic combustor is divided into a primary and a secondary catalytic combustion chamber with a heat exchanger between the two combustion chambers. In the preheater the low heating value gas mixed with combustion air is passed in indirect heat exchange with products of combustion from the first combustion chamber before the low heating value gas is delivered to the first combustion chamber. The turbine system is particularly advantageous in recovering power from low heating value gas in which the combustibles are hydrocarbons, primarily methane.

Ricks, U.S. Pat. No. 4,209,303, describes a method and apparatus is disclosed for recovery of combustible gas formed from combustible refuse or vegetable matter in an enclosed space from which the combustible gas is collected. Water can be injected into the apparatus and the decay process initiated and promoted by activating a heating element projecting upwardly from the base of the apparatus into the material undergoing decomposition. The combustible gas contains a substantial proportion of methane.

Zison, U.S. Pat. No. 4,442,901, describes a method of collecting landfill gas from a landfill comprising providing a porous collector in the landfill having a relatively broad collection zone in the path of migrating landfill gas, controlling the pressure in the collector to induce the landfill gas near the collector to flow into the collector, removing the landfill gas from the collector, and substantially excluding air from the atmosphere from entering the collector when the collector is collecting landfill gas.

Zison , et al. U.S. Pat. No. 4,469,176, describes landfill gas recovery system, the breakthrough danger is minimized, and the system efficiency is improved, by providing pressure-equalizing low-impedance gas paths such as aggregate-filled. symmetry trenches positioned within the landfill and surrounding, at least partially, the primary collection zone. The symmetry trenches may be connected to the system's low-pressure source to serve as secondary collectors. A sensing trench positioned within the landfill along the periphery of the collector's zone of influence can be used to monitor the collector pressure and to automatically maintain it at a safe level. The sensing trench can also serve as a secondary equalizing path in heterogeneous landfills. Hot spots may advantageously be tapped by auxiliary collectors whose pressure level bears a predetermined proportional relationship to the primary collector pressure.

Moilliet, U.S. Pat. No. 4,493,770, describes a method which heat can be recovered by biological generation of heat upon aeration of refuse, such as garbage or sludge, in an aeration vessel by introducing oxygen-containing gas, such as air, in a closed cycle to thereby enrich gas withdrawn from the vessel with the oxygen, typically by reintroduction of gas withdrawn from an upper gas portion of the vessel, after introduction of additional oxygen, for example controlled by a valve into a lower portion of the contents of the aeration chamber. Control can be effected automatically, by a control unit through a valve or manually; automatic control can be effected, for example, by sensing oxygen or carbon dioxide concentration by suitable sensors within the vessel. To permit recovery of methane of high quality in a subsequent decomposition and methane recovery container, material withdrawn from the aeration vessel is degassed in degassing chambers for example by storage for about ½ hour, and venting of emanating gases. Control of valves regulating flow from, and to, the aerating vessel and the degassing chambers permits preheating of freshly introduced refuse by the material withdrawn from the degassing chambers in a counter flow heat exchanger, while preventing possible escape of non-aerated substances from the vessel by isolating the aeration vessel during introduction of new refuse, and emptying only a chamber of said degassing chamber system.

O'Brien et al., U.S. Pat. No. 4,681,612, describes a recycle process for the separation of landfill gas containing a wide variety of impurities into a carbon dioxide product stream and a fuel-grade-pressurized methane product stream, the process providing for the removal of both the impurities and the carbon dioxide in a cryogenic column as a bottom stream, the separation of the methane from the overhead product stream by a membrane process, and, optionally, the removal of impurities from the carbon dioxide bottom stream in a separate purification column, to recover a high-quality, liquid, carbon dioxide stream.

Nobilet et al., U.S. Pat. No. 4,769,149, describes a process for recovery of energy from waste and residues is disclosed. The residues, after sieving, are subjected to bacterial digestion in a methanization reactor and the solid phase of the digestate is then subjected to incineration in a furnace supplying a heat recuperator, the furnace being supplied with complementary combustible by the methane coming from the digester, while the circuit of the fumes downstream of the recuperator is used for heating by at least one secondary circuit, the magma in the course of treatment in the digester and/or the sludge separated from the digestate before recycling thereof towards the digester.

Watson et al., U.S. Pat. No. 5,059,405, describes a process and apparatus for removing the impurities from a gas stream produced from a landfill such that essentially pure carbon dioxide and methane is recovered. After the landfill gas is mechanically dewatered, the gas is filtered of particulate solids and aerosols and purified by removing sulfur compounds using zinc oxide columns, removing halogens using activated alumina columns, removing hydrocarbons using activated charcoal columns, and oxidizing remaining impurities using potassium permanganate impregnated activated alumina columns. Lastly the gas is incinerated in a boiler/incinerator combustion furnace to produce an exit stream containing essentially pure carbon dioxide and air, which is further treated in a conventional carbon dioxide treatment process.

Siwajek, U.S. Pat. No. 5,842,357, describes a process for concentrating and recovering methane and carbon dioxide from landfill gas includes absorption of commonly occurring pollutants using a reduced amount of carbon dioxide absorbent which itself may be an in situ derived and recoverable constituent. Separated methane may be concentrated into a high heating value fuel, and a highly pure food-grade carbon dioxide product may also be recovered. Process streams may be used to provide fuel for compression and refrigeration and/or to regenerate carbon dioxide absorbent.

In addition to the above prior art references we know that methane emissions, from many sources, such as cattle, landfills, marshes, swamps and from coal, natural gas and petroleum exploration and production seeps into the atmosphere in very low concentrations. The U.S. EPA estimates the aggregate amount of human-related sources of such methane emissions are 70 percent of the total and are over 30 million tons of methane emitted annually in the U.S., causing global warming and other environmental problems. About 19% of the methane emitted due to human activities comes directly from farm animals, 20 percent from oil and natural gas operations, 36% from landfills, 10 percent from coal mines, 9 percent from animal manure and the rest from other sources. Methane emissions from natural sources such as wetlands and marshes constitutes 30 percent of the methane, perhaps another 13 million tons annually in the U.S. Worldwide emissions of methane are at least ten times as large.

Methane is a very potent greenhouse gas, with 25 times the potential for global warming compared to carbon dioxide. Methane is produced naturally, is non-toxic, and its emissions are not regulated. However, the United States Environmental Protection Agency (EPA) has become concerned about the potent global warming effects of methane, and now has a strong Methane Energy Branch.

Enormous quantities of methane are emitted from natural and man-made sources each year. Methane is evolved when organic matter breaks down in an atmosphere starved of oxygen. Landfills emit methane in low concentrations. Marshes and swamps also produce and emit methane, once known as "marsh gas". Methane is also generated during the production of several crops, such as rice, where the field is fully or partly submerged in water during plant growth. The digestive process of farm cattle converts about roughly ten percent of their food intake into methane, emitted directly from the animal itself. For example, a ruminant adult cow's digestive system produces over 100 kg or about 220 pounds of methane a year, approximately 5,000 cubic feet. Similar natural processes convert the organic matter in swamps and water treatment facilities to methane. Much of this methane is emitted in very low concentrations, and simply becomes a part of the atmosphere, and a major contributor to global warming. Methane is also emitted from natural gas, coal and petroleum exploration and recovery operations. Each of these sources of methane has been well documented by the EPA. The EPA states, "As a contributor to climate change, methane is second only to carbon dioxide. Over the last two centuries, methane concentrations in the atmosphere have more than doubled, largely due to human-related activities. Reductions of about 10 percent in emissions from these anthropogenic sources would halt the annual rise in methane concentrations, effectively contributing to mitigation of climate change." The EPA estimates that over 30 million tons of such methane are emitted in the U.S. alone.

Methane today is used in a highly concentrated form. Natural gas is about 90% methane. The "best" landfills produce about 50% methane; that is, the gas as evolved at ground level is only one-half methane. It is increasingly recovered for the production of electricity. However, most methane is emitted in far lower concentrations and it is simply not considered practical to recover it for useful benefit. Except in certain cases, such as landfills, where the recovery of high-concentration gases is sometimes feasible, there exists no practical method for recovery of most freely evolved methane today, and, because it is slightly lighter than air, it rises into the atmosphere to exacerbate global warming. Methane recovery from crop sources is not a known practice today.

The prior art teaches the use of methane in the generation of electricity by collecting high concentrations of this gas, but does not teach an apparatus and method for recovery and use of very low concentrations of methane from natural and man-made sources. The present invention fulfills these needs and provides further related advantages as described in the following summary.

SUMMARY OF THE INVENTION

The present invention teaches certain benefits in construction and use, which give rise to the objectives described below.

This invention provides a process and apparatus for collecting and using extremely low concentrations of methane for producing electricity and heat. The methane that is vented into the air is collected and concentrated by covering the emissions area, trapping the methane and local air. Methane continues to seep into the container and is allowed to concentrate over time. When the concentrations are high enough to usefully recover the energy (about 1% by volume or less), the. gas is drawn into a catalytically combusted turbine. No other fuel is needed. Methane concentrations in the top of the container are naturally higher because methane is lighter than air. The higher concentrations are used to increase power output. Precautions must be taken for safety and concentrations should be maintained sufficiently low to ensure safety. This method may be used for any other low-concentration gases that may be oxidized to produce heat.

The apparatus and method described here provides a means to collect and use such gas for the production of electricity and useful heat in a turbine in a manner harmonious with the environment. The apparatus consists of a means for collecting such gas and allowing the gas concentrations to increase over time; a means for further local concentration of the methane by virtue of its specific gravity being significantly lower than air; a means for delivering the methane-laden air mixture to a turbine; a means for compressing and heating the mixture; a means for catalytic combustion of the mixture in a relatively simple catalytic combustor; a means for controlling the power output; a means for protecting against premature combustion and its attendant hazards. While methane gas is used for illustration in this narrative, any other gas or combination of gases or vapors that are able to be exothermically oxidized may be used with this system with suitable modifications.

As stated, a building structure encloses a gaseous mixture of air and a combustible fuel. Air is obtained from the atmosphere, and the gaseous fuel is obtained from natural evolution and diffusion processes associated with decomposition of materials, as from landfills, and gaseous digestion products from livestock, crop growth processes, etc. A process control system is engaged for drawing off the gaseous mixture, at a selected air-fuel ratio, from the structure. The selected gaseous mixture is drawn from the building, through a compressor and then a pre-heater, into a catalytic combustor where the mixture is burned and directed into a turbine for producing work. This work is preferably converted into electricity by a generator driven by the turbine. A process controller senses process variables such as temperature, pressure, flow rate, fuel concentration, etc. so as to assure that combustion cannot occur prematurely, but does occur most efficiently in the catalytic combustor. Process heat is used for preheating the mixture to be burned.

A primary objective of the present invention is to provide an apparatus and method of use of such apparatus that provides advantages not taught by the prior art.

Another objective is to provide such an invention capable of using low level gaseous fuels currently regarded as not practically usable.

A further objective is to provide such an invention capable of controlling the efficient combustion of such fuels to produce useful work.

A still further objective is to provide such an invention capable of safe and cost effective operation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a schematic of a preferred embodiment of the invention wherein solid lines define structural elements of the invention as well as process flow, circles define measurement and sensing apparatus, and broken lines define control signal paths; and FIG. 2 is a schematic of a further preferred embodiment thereof.

DETAILED DESCRIPTION OF THE INVENTION

The above-described drawing figures illustrate the invention in at least one of its preferred embodiments, which is further defined in detail in the following description.

Methane, or other fuel gas is captured in a sealed building or container 1, that prevents the methane from seeping into the atmosphere. If a building is used, it is made fairly airtight. The building may be made of glass or other transparent material in order to let sunlight in to sustain agriculture or for other purposes. The building normally contains air at the start, and this is acceptable and desirable. Additional air may be let in, if needed to maintain the desired air-fuel ratio, through inlet valve 2 and entry point 3 and connector pipe 4, with heat provided if desired, by heater 22. The building may be vented to the atmosphere at exhaust pipe 6, either through the top vent 25, or the bottom vent 11. Should any methane be present in the gas being vented, the gas may be passed though a catalytic converter 32 which will oxidize the methane into $CO_2$, a much less potent greenhouse gas. The process maintains the building at a pressure slightly below atmospheric, thus causing air to be drawn into the container through cracks, etc. and in this manner, the structure, which may be very large to cover a large land area, is not required to be air transfer tight.

The methane concentration in the structure increases gradually as emissions seep in, usually from the ground. Methane being non-toxic; the air inside is breathable as long as concentrations are low enough that the oxygen content of the air is not seriously depleted. The reduction in oxygen when methane concentrations build up 1 to 2 percent of methane would be no more than the loss of oxygen resulting from an altitude of two or three thousand feet. The air-fuel mix required for methane in a microturbine is generally in the range of 1% to 2% methane by volume. Therefore, when the methane concentration reaches one percent methane, the mixture contains sufficient energy to power a catalytically combusted microturbine. Methane gas is much lighter than air and will tend to concentrate toward the top of the container. The container may be equipped with baffles to create quiet zones for minimizing turbulence, thus promoting the migration of methane to the top. Even though the methane-air mixture will vary, the mixture at any given elevation will be fairly homogeneous. The system is designed to benefit from variations in methane concentrations. Should a higher methane concentration be desired, the gas may be drawn off the top of the container, and if a lower concentration is desired, the gas may be drawn from the middle of the container.

There are many other sources of low methane concentrations, and variations on the above may be used to recover the methane from those sources as well. Also, while a microturbine is described here, any turbine that uses this method may be used subject to considerations of safety and catalytic combustor capability. Furthermore, while methane gas is described here, any fuel gas or vapor may be used with the appropriate variations. For example, hydrocarbon vapors generated from remediation of soils saturated by gasoline and other fuels may be heavier than air, and concentrate near the bottom, rather than near the top of the container. Obviously, if the gases emitted are toxic, the atmosphere inside the container may not be able to sustain life and appropriate precautions are necessary.

Traditional turbine operation uses injected pressurized fuel just prior to, the combustion chamber. In the present invention, there is no fuel as such; instead, there is a rather small amount (perhaps one to two percent) of methane in the incoming air. In most applications, the mixture is safe. It will not ignite even if a spark or blowtorch is introduced. In order to be able to combust the methane, two pre-conditions must be met: first, the temperature of the mixture must be raised to the point where catalytic combustion will take place, and second, the gas must then pass through an appropriately designed catalytic combustor.

Points 26, 27, 28 and 29 are points at different heights within the building or container, each of which can extract a different air-fuel ratio. Depending on the requirement of the turbine at a given time, one or more of the mixture extraction points 7, 8, 9 or 10 may be used to supply the turbine with the appropriate fuel mixture. This mixture is then blended together and introduced to the turbine compressor 13, where it is compressed, and delivered through the pipe 17 to be heated in the recuperator 20 until it reaches the appropriate temperature for the catalytic combustor 18. From the catalytic combustor, the hot gases enter the turbine 14. The turbine 14 converts the heat and pressure energy to mechanical energy, driving the generator 16 to make electricity or driving a mechanical process. Turbine exhaust gases are delivered to the recuperator (heat exchanger) 20 via pipe 19 where heat is given up to the incoming mixture. The heat in the exhaust gases is preferably also be used in an air heater (heat exchanger) 22 to heat makeup air entering the building or for other useful purpose, after which the gases are discharged to the atmosphere via pipe 23. The turbine 14 shown in FIG. 1, is placed external to the structure 1; however, nothing prevents it from being placed inside the structure 1.

An advantage of this system is that because there is no separate fuel system, the combustion temperature cannot exceed the stoichiometric temperature for the complete mixture. Another advantage is that the low concentration of fuel in the system is within the range for catalytic converters commonly used for exhaust gas cleanup. This allows the catalytic combustor to be adapted from low-cost catalytic converters developed to clean up exhaust emissions for automobiles and other industrial applications.

As the gas mixture is drawn from the building, replacement air must be added to the building. This air is shown delivered through pipe 3 through the air heater 22. Valves 4 and 29 may be used to directly let air into the building or container if heating of incoming air is not desired.

In some cases, rather than have a rigid structure, it may be more practical to use an inflated collapsible structure. FIG. 2 shows such a container. As with a rigid building, the container must be transparent to pass sunlight if needed for growing or other reasons. An inflatable container must be slightly pressurized in order to maintain its shape. This increases slightly its storage capacity, allowing for increases in the total quantity of gas within the container. However, air tightness is more important, because any leakage will cause methane to seep into the atmosphere. Leakage is not catastrophic because the methane being trapped is non-toxic and was in most cases already vented to the atmosphere prior to the installation of the container. Such leaks at worst leave the situation no worse than before. As with the rigid container, should the gas concentration become too great, the container may be vented, through a top or bottom vent, with vent selection based upon the concentration within the container. As before, venting may preferably be performed through a catalytic converter.

Should it be desirable at startup or other times, a source of methane may be used to enrich the gas seeping into the system. This methane may be used to maintain or increase turbine output. In an alternate method, the system may be used as a storage system for a safe blend of fuel gas and air for a turbine fuel system, or used in conjunction with a gas leakage control system where any gas leaks, such as from an industrial or production process, are directed into the container for use in the turbine. With such a system, gases of varying compositions and energy contents may all be collected and blended together for use, long as the overall energy content of the mixture is appropriate for its intended use and an appropriate catalytic combustor selected.

Should it be necessary to reduce the concentration of methane for safety or other reason, the top vent 6 is preferably used because the concentration of methane is highest at the top. The vent gas may be processed through a catalytic converter to eliminate any methane from reaching the atmosphere. Should the pressure in the container approach design limits, as emissions or temperature increases, but the concentration of methane inside the container is low, the container may be vented through the bottom vent 11, where the concentration of methane is the lowest. This gas may also be vented through a catalytic converter 22 for oxidation of methane, thereby preventing it from reaching the atmosphere.

Unlike traditional gas turbines where the fuel-air ratio must be closely controlled in order to achieve proper combustion and in order to control NOx, in this invention the fuel and air are combined homogeneously so that all of the gaseous mixture entering the catalytic combustor is burned. In order to prevent NOx formation, the temperature in all cases is held well below the temperature of NOx formation.

It is also important that the concentration of methane in the container stay well below the flammable and explosion limits of the methane. Without this precaution, the safety of the system is in jeopardy.

Another consideration is safe shutdown. If the fuel-air mixture is the only source of gas to the compressor, it may not be easy to shut the turbine 14 down since a vacuum would be formed in the compressor upstream. Valves 33, 34 are provided to shut off the fuel-air mixture and to replace it with outside air, thereby enabling a rapid and safe shutdown.

The concentration of methane, or other combustible gas or vapor content within the container is measured and this temperature data is fed to the controller 24. The mixture is compressed and heated prior to entering the catalytic combustor. The mixture should therefore be maintained as far from the auto-ignition range as is feasible. If the mixture fuel content reaches the auto-combustion range, the likelihood of auto-ignition during compression and heating is high. Auto-ignition is a function of concentration, temperature, time and pressure. An auto-combustion envelope relating to concentration, temperature, time and pressure for certain gases has been developed as a result of prior testing to establish these parameters. Such an envelope can be developed for other gases as well. The controller 24 is pre-programmed with information that creates the pressure-time-temperature-fuel concentration envelope for the mixtures being used. The controller makes sure that the gaseous mixture is as far from the envelope as possible. This effectively prevents the mixture from auto-ignition prior to entering the catalytic combustor, and assures operational safety.

As an example, it has been determined through testing that a fuel concentration of 5% methane in air, at a pressure of 4 atmospheres will begin to ignite at 1000 degrees F., within 0.1 second. If the mixture is 2% of methane in air, then at the same pressure and temperature, it is known that ignition will not occur for 0.4 seconds. If for a particular configuration, it is determined that the actual time for gas to travel through the system is only 0.2 seconds, then a mixture of 2% methane in air or less for the same temperature-pressure situation will prevent auto-ignition and is inherently safe. The system controller (24) is programmed to "watch" the temperature, pressure and time conditions so that auto-ignition will not occur until the mixture is within the catalytic combustor 18. Therefore premature ignition is prevented. Safety is thus assured by the present invention.

The functions of the controller 24, used with this invention for controlling the system include traditional control functions such as purging, safe startup and shutdown, load control, pressure and temperature monitoring and so on, but in addition includes the following control features unique to this invention:

It monitors the methane concentration at several elevations in the container, and selects one or more source of gas to meet the turbine's requirements. It regulates turbine speed in order to control output power. It keeps methane concentrations outside the pressure-temperature-time envelope that could result in auto-ignition of the fuel mixture by regulating the air inlet into the container. It keeps the pressure inside the container from building up by selectively venting the container. It manages the temperature of the gas inside the container by using turbine exhaust heat. It bleeds in outside air for safe shutdown.

As described above, the present invention is a compound apparatus for collecting gaseous emissions containing combustible products and for converting these emissions into useful energy. A structure. 1, which may be inflatable, or rigid, or have a combination of inflatable and rigid portions, encloses a gaseous mixture of air and a gaseous combustible fuel. 26, 27, 28 and 29 as shown in FIG. 1. Since the gaseous mixture is comprised of at least one gas with a specific gravity differing from that of air, assuming convection mixing of the gaseous constituents is prevented, the ratio of fuel to air will vary with vertical position within the structure. The numerals: 26–29 are intended therefore to denote mixtures of the air and fuel which differ in the fuel-air ratio. If the structure is at least partly inflatable, a means for inflation "B" is provided, such as a motorized blower (FIG. 2). Such inflatable structures are well known in carnivals and such so that further details of this aspect of the present invention is not described here. In FIG. 1, a venting means 8, 9, 10 and 11, such as electrical or hydraulic valves, is engaged with the structure 1, and positioned for drawing off the gaseous mixture, at a selected air to fuel ratio, again, depending upon vertical position. In the event that it is needed, the invention further comprises a means for introducing a further gaseous fuel into the structure. An air inlet means 2, such as a mechanical valve and inlet manifold, is also engaged with the structure 1 for adjusting the air-fuel ratio to assure that combustion cannot take place prior to the catalytic combustor 18. However, a catalytic combustor 18 is enabled for receiving and combusting the gaseous mixture 26–29 external to the structure 1. A turbine 14 is enabled for receiving the combusted gaseous mixture from the catalytic combustor 18 and is enabled for producing useful energy from it as is well known in turbine technology and processes in the art. A process controller 24, such as a computer based control system, well known in the art, controls the air-fuel ratio of the gaseous mixture 26–29 delivered to the catalytic combustor 18. A compressor 13 is enabled for receiving and compressing the gaseous mixture 26–29 from the structure 1 prior to its introduction into the turbine catalytic combustor 18 and turbine 14. It should be noted that mechanical drive 15 enables the compressor 13 to be driven by the turbine 14 so that part of the energy derived by the combustion process within the turbine 14 is used for compressing incoming gas. The invention preferably further comprises a means for extracting heat 20 from exhaust gases 19 of the turbine 14, and for using this extracted heat for heating the incoming gaseous mixture 26–29 prior to entry into the catalytic combustor 18. A means for measuring the fuel content, and a means for measuring the temperature of the gaseous mixture is beneficially employed and these are denoted in FIG. 1 by "M" and are of typical construction and application well known in the art for sensing process variables. The controller 24 is enabled by its programming for preventing ignition of the gaseous mixture prior to its entry into the catalytic combustor 18. A further means for extracting heat 22 from exhaust gases 19 of the turbine 14 and delivering this heat to air taken into the structure 1 may be employed wherein the heat extracting means 22 is enabled for heating or vaporizing a fuel if it is desired to include such with the inlet air as it moves into the structure 1. Valves, 33 and 34 are placed to introduce outside air for safe shutdown of the turbine 14. A means for exhausting 25 some of the gaseous mixture from the structure 1 may be employed as shown in FIG. 1. This means 11 or 25 may be mechanical valves similar to those described above. The exhaust may be directed through catalytic converter 32 by controlling the valves shown. The catalytic converter 32 is used to convert the fuel portion of the exhausted gases to carbon dioxide. Preferably, a portion of the structure I is transparent, so that light may enter.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for collecting gaseous emissions containing combustible products and for converting the gaseous emissions into useful energy, the apparatus comprising:
   a structure enclosing a gaseous mixture of air and a gaseous combustible fuel;
   a venting means engaged with the structure, the venting means placed for drawing off the gaseous mixture, at a selected air to fuel ratio, from the structure;
   an air inlet means engaged with the structure for adjusting the air to fuel ratio of the gaseous mixture so that combustion cannot be supported;
   a catalytic combustor enabled for receiving and combusting the gaseous mixture;
   a turbine enabled for receiving the combusted gaseous mixture from the catalytic combustor for producing the useful energy; and
   a process controller enabled for controlling the air to fuel ratio of the gaseous mixture delivered to the catalytic combustor.

2. The apparatus of claim 1 wherein at least one portion of the structure is inflatable, and further comprising a means for inflating said portion.

3. The apparatus of claim 1 further comprising a means for introducing a further gaseous fuel into the structure.

4. The apparatus of claim 1 further comprising a compressor enabled for receiving and compressing the gaseous mixture from the structure prior to introduction thereof into the turbine.

5. The apparatus of claim 1 further comprising a means for extracting heat from exhaust gases of the turbine and, further comprising a means for heating the gaseous mixture therewith.

6. The apparatus of claim 1 further comprising a means for heating the gaseous mixture prior to entry into the catalytic combustor.

7. The apparatus of claim 1 further comprising a means for measuring the fuel content of the gaseous mixture.

8. The apparatus of claim 7 further comprising a means for measuring the temperature of the gaseous mixture.

9. The apparatus of claim 8 wherein the controller is enabled for preventing ignition of the gaseous mixture prior to entry thereof into the catalytic combustor.

10. The apparatus of claim 5 further comprising a means for extracting heat from exhaust gases of the turbine and delivering said heat to air taken into the structure.

11. The apparatus of claim 10 wherein the heat extracting means is enabled for vaporizing a fuel, said vaporized fuel being drawn into the structure.

12. The apparatus of claim 1 further comprising a means for exhausting the gaseous mixture within the structure to atmosphere through a catalytic converter.

13. The apparatus of claim 1 wherein at least a portion of the structure is transparent, for allowing light to enter therein.

14. The apparatus of claim 1 further comprising a means for introducing outside air into the turbine for safe shutdown.

15. A method for collecting gaseous emissions containing combustible products and for converting the gaseous emissions into useful energy, the method comprising:

erecting a structure for enclosing a gaseous mixture of air and a gaseous combustible fuel;

venting the structure in a manner for drawing off the gaseous mixture, at a selected air to fuel ratio;

adjusting the air to fuel ratio of the gaseous mixture so that combustion cannot be supported within the structure;

combusting the gaseous mixture in a catalytic combustor; and driving a turbine with the combusted gaseous mixture from the catalytic combustor so as to produce useful energy.

16. The method of claim 15 further comprising the step of inflating the structure.

17. The method of claim 15 further comprising the step of compressing the gaseous mixture from the structure prior to introduction thereof into the turbine.

18. The method of claim 15 further comprising the step of heating the gaseous mixture with extracted heat from exhaust gases of the turbine.

19. The method of claim 15 further comprising the step of actively preventing ignition of the gaseous mixture prior to entry thereof into the catalytic combustor.

20. The method of claim 15 further comprising the step of vaporizing a fuel being drawn into the structure with heat extracted from turbine exhaust gases.

21. The method of claim 15 further comprising the step of exhausting a portion of the gaseous mixture within the structure to atmosphere through a catalytic converter.

22. The method of claim 15 further comprising the step of introducing outside air into the turbine for shutdown thereof.

* * * * *